Figure 1:
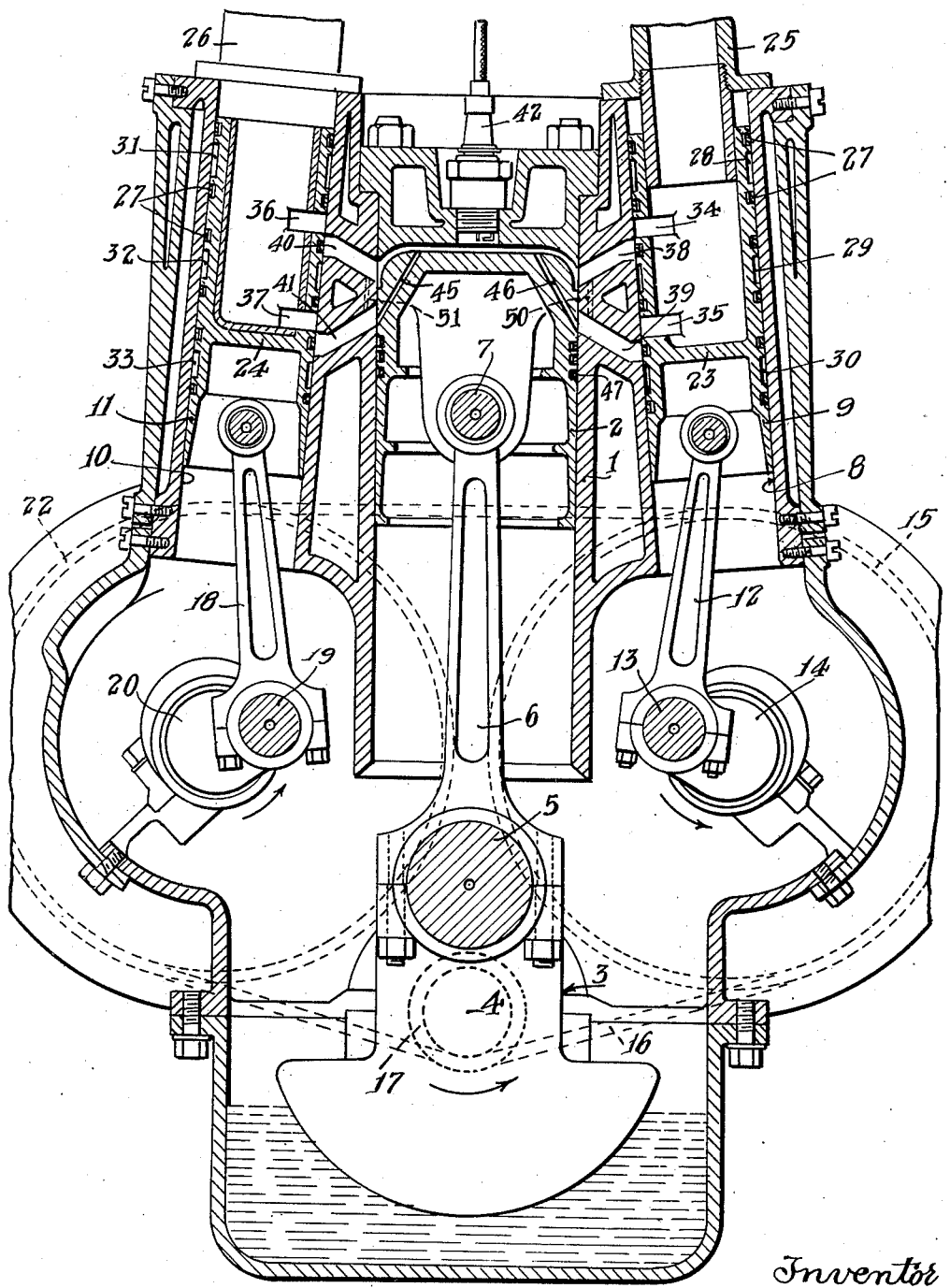

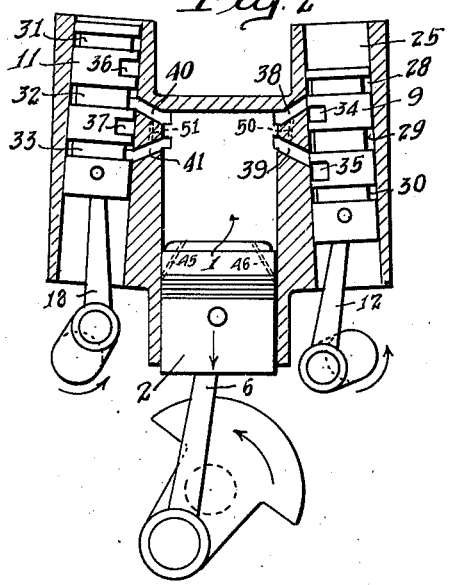
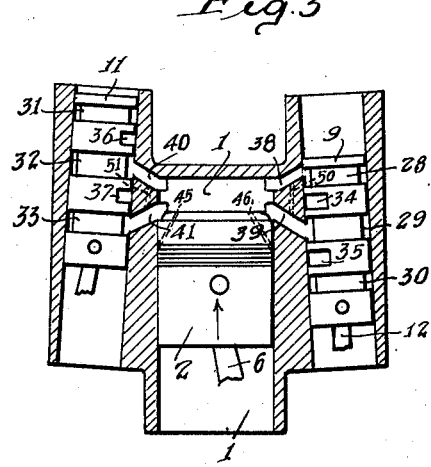
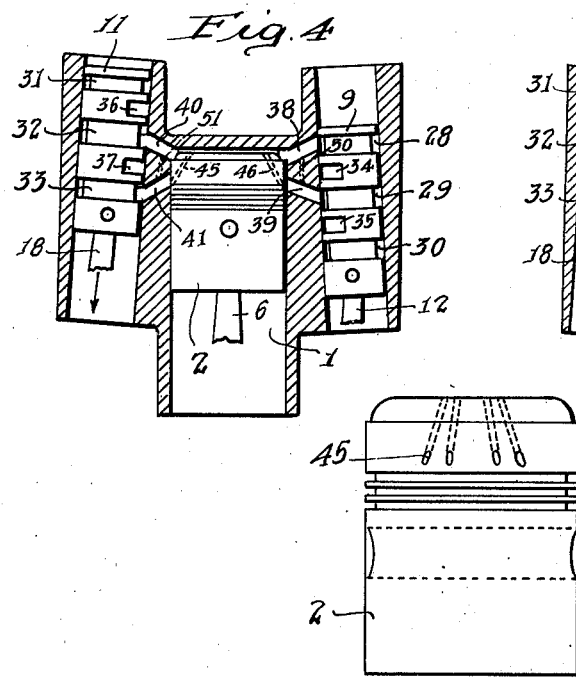
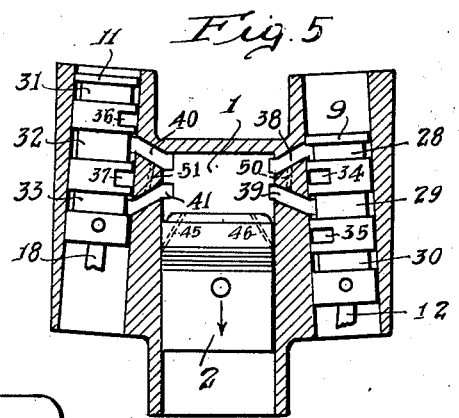

Patented May 21, 1940

2,201,292

UNITED STATES PATENT OFFICE 2,201,292

INTERNAL COMBUSTION ENGINE

Henri J. Hickey, Beverly Hills, Calif.

Application January 27, 1939, Serial No. 253,105

6 Claims. (Cl. 123—75)

This invention relates to internal combustion engines, and more particularly to the particular type of engine disclosed in my prior Patent Number 1,995,307, issued March 26, 1935, in which a separate chamber is provided which communicates with the main working cylinder through a port adapted to be covered and uncovered by the working piston.

A general object of the invention is to increase the efficiency of an internal combustion engine.

A more specific object is to increase the compression ratio of the engine without producing undesirable knocking and excessive bearing strain.

In the engine disclosed in my aforementioned prior patent, the valve arrangement and valve passages are such as to provide auxiliary chambers leading into the main working cylinder, but spaced from the end of the cylinder so that they are covered and uncovered by the main working piston. Furthermore these auxiliary chambers are positioned near the inner end of the cylinder (the inner end being defined as that in which the gaseous charge is compressed), so that they are open to receive gas during the compression stroke of the engine until the piston gets quite near the end of its stroke, after which they are cut off until after the charge in the end of the cylinder has been ignited and the piston has returned part way on its working stroke. As the piston uncovers the auxiliary chambers on the working stroke, the gas previously compressed into the auxiliary chambers is ignited to increase the force against the piston during the midportion of the stroke when the piston is traveling most rapidly, and is exerting a thrust on the crank at a more effective angle.

The construction of the prior patent is very useful in that it greatly increased the compression ratio that could be employed without knocking and provided an engine of great overall efficiency. I have discovered, however, that the efficiency of the engine can be further increased by providing restricted passages which communicate the working cylinder with the auxiliary chambers during the extreme end of the stroke of the piston. This permits a certain amount of the gases compressed in the end of the cylinder to escape into the auxiliary chambers after the working piston has covered the ports leading to the auxiliary chambers. This reduces the peak thermal pressure and the peak thrust on the bearings of the engine, thereby permitting the use of a higher average compression ratio which results in increased total efficiency without objectionable results.

A full understanding of the present invention may be had from the detailed description of a particular embodiment of the invention illustrated in the drawings, in which Fig. 1 is a cross sectional view through an engine in accordance with the invention, showing the piston in dead center position at the end of the exhaust stroke and the beginning of the intake stroke;

Figs. 2, 3, 4 and 5 are schematic views showing the working piston and the valve pistons in the positions they occupy during the intake stroke, the compression stroke, a first part of the working stroke, and a second part of the working stroke, respectively; and Fig. 6 is a side elevation view of the working piston, shown in section in Fig. 1.

Referring first to Fig. 1, the engine therein disclosed comprises as its essential elements, a working cylinder 1, a working piston 2 mounted therein, a crankshaft 3 having a center of rotation 4 and having a throw 5 on which is mounted a connecting rod 6, the upper end of which connects to the wristpin 7 of the piston 1. It will be understood that the engine may be of the multicylinder type, various details of which are disclosed in my prior patent, previously referred to. However, for the purpose of explaining the present invention, it is necessary only to consider the structure of one cylinder, and its associated working piston and valve mechanism.

The working cylinder 1 has associated therewith a pair of valves of the piston type. Thus there is an inlet valve cylinder 8 having a valve piston 9 reciprocable therein, and an exhaust valve cylinder 10 having a valve piston 11 reciprocable therein. The inlet valve piston 9 is actuated through a connecting rod 12 from a throw 13 on an auxiliary crankshaft 14 which is driven through a sprocket 15 thereon, a chain 16 and a sprocket 17 on the crankshaft 3 at one-fourth the speed of the main crankshaft and in the same direction. The exhaust valve piston 11 is similarly reciprocated through a connecting rod 18 and a throw 19 on a second auxiliary crankshaft 20 which is also driven in the same direction and at one-fourth the speed of the main crankshaft 3 by the chain 16 which in addition to being looped over the sprocket 15 is also looped over a sprocket 22 on the auxiliary crankshaft 20.

The intake valve piston 9 is hollow and open at the upper end but has a partition wall 23 which interrupts communication between the upper portion of the hollow valve and the crankcase. Similarly, the exhaust valve piston 11 has a partition 24 therein. The intake valve cylinder 8 communicates directly at its upper end with an intake manifold 25 and similarly the upper end of the exhaust valve cylinder 10 communicates with an exhaust manifold 26.

Each of the pistons 9 and 11 has a plurality of sealing rings 27 thereon, which effects a seal between certain annular grooves in the outer surface of the piston and ports in the piston. Thus the intake valve piston 9 has an upper, annular groove 28, an intermediate annular groove 29, and a lower annular groove 30. The exhaust valve piston 11 has upper, intermediate and lower annular grooves 31, 32 and 33, respectively. The intake valve piston 9 has a port 34 positioned between the annular grooves 28 and 29 and a port 35 positioned between the annular grooves 29 and 30. Similarly, the exhaust valve piston 11 has a port 36 positioned between the annular grooves 32 and 33.

When the intake valve piston 9 is in its midstroke position, the ports 34 and 35 register with the outer ends of a pair of passages 38 and 39, respectively, in the cylinder wall 1, the inner ends of these passages terminating in longitudinally spaced ports in the cylinder surface. Similarly, when the exhaust valve piston 11 is in midposition, the ports 36 and 37 register with the outer ends of a pair of passages 40 and 41, respectively, in the wall of cylinder 1; the inner ends of these passages likewise terminate in longitudinally spaced ports opening into the working cylinder.

When the intake valve piston 9 is in uppermost position, the outer ends of the passages 38 and 39 register with the annular grooves 29 and 30, respectively, and when the valve piston is in extreme lowermost position, the outer end of the passages 38 and 39 register with the piston grooves 28 and 29, respectively. The purpose of these annular grooves is to distribute the gas pressure developed in the working cylinder and applied through the passages 38 and 39 to all sides of the valve piston 9 so as not to develop side pressure thereon.

The exhaust valve piston 11 functions in a manner similar to that outlined for the intake valve piston. Thus the passages 40 and 41 register with the annular grooves 31 and 32 when the valve piston is in lowermost position and with the grooves 32 and 33 when the valve piston is in uppermost position.

In the particular structure shown in Fig. 1, a spark plug 42 is provided in the inner end of the cylinder 1 for igniting the charge from any suitable ignition system, not shown. It is to be understood, however, that the principles of the invention may be applied to engines of the Diesel or semi-Diesel type in which other means than spark plugs are employed to ignite the charge.

The structure so far described corresponds to that of any prior patent. The present invention involves additional structure, whereby the lower passages 41 and 39, which are covered and uncovered by the working piston, are communicated with the inner end of the working cylinder during a portion of the time when they are covered by the piston. To this end the piston 2 has restricted passages 45 and 46 extending diagonally therethrough from the side walls of the piston to the end wall thereof. As shown in Fig. 6, there are four passages 45 and four passages 46, all arranged to register, at their lower ends, with their associated cylinder passages 41 and 39 during a certain portion of the stroke of the piston 2. As shown in Fig. 6, the lower ends of the passages 45 are spaced arcuately along the piston surface but they all register with the passage 41 because the latter is elongated circumferentially at its inner end where it enters the cylinder wall. The number of the passages may be varied, and also the diameter. I have found it satisfactory to employ four passages in each group as shown in Fig. 6, and to make each passage approximately one-eighth inch in diameter in an engine having a bore diameter of 3⅜ inches. The usual sealing rings 47 of the working piston 2 are positioned below the level of the passages 45 and 46.

I prefer to so vertically position the outer ends of the piston passages 45 and 46 that they begin to register with the passages 41 and 39 when the crankshaft is about 18° ahead of dead center position. It follows that the passages 43 and 46 remain in communication with the passages 41 and 39 while the piston is moving over dead center and break connection 18° past dead center position. This communication of the end of the cylinder with the passages 41 and 39 through the restricted passages 45 and 46 in the piston provides an outlet for the exploded gases in the end of the cylinder during the time of peak pressure; that is, immediately following the ignition of the charge. It thereby reduces the peak thermal pressure and as a result reduces the tendency to knock and reduces the maximum force on the bearings. As a result, the space above the piston at dead center position may be reduced to further increase the overall compressive ratio of the engine above what it could be if the passages 45 and 46 were omitted.

To completely clarify the operation of the engine, operation through a cycle will be briefly traced with reference to Figs. 1, 2, 3, 4 and 5. In Fig. 1 the working cylinder is on dead center position at the end of the exhaust stroke, the exhaust piston 11 is moving up and the ports 36 and 37 are just moving out of registration with passages 40 and 41. At this time the intake valve 9 is moving down and the valve piston ports 34 and 35 are just beginning to register with the passages 38 and 39. As the working piston moves downward on its intake stroke, as shown in Fig. 2, the exhaust valve piston 11 continues its upward movement, maintaining the outer ends of the passages 40 and 41 closed and intake valve piston 9 has moved downward to communicate passages 38 and 39 with the intake manifold 25. Therefore as the working piston 2 moves downward it draws a charge through the manifold 25 and the passages 38 and 39 into the working cylinder 1. After the working piston passes over dead center position, it strikes its upward or compression stroke. During this stroke, the exhaust valve piston 11 reaches its fully closed position, in which the annular grooves 32 and 33 register with the outer ends of the passages 40 and 41. Likewise the intake valve piston 9 continues its downward movement to carry the ports 34 and 35 out of registration with the passages 38 and 39 and align the grooves 28 and 29 with the passages 38 and 39. The pistons are approaching this position in Fig. 3 and have fully reached them in Fig. 4, at which time the piston has fully compressed the charge in the upper end of the cylinder in the passages 38 and 40 and in the annular groove 32 in the exhaust valve piston and the annular groove 28 in the intake valve piston. However, prior to closure of the inner ends of passages 39 and 41 by movement of the working piston, the charge compressed in the main cylinder escapes into those passages 41 and 39 and the juxtaposed grooves 33 in the exhaust pistons 11 and groove 29 in the intake valve piston. Furthermore, as soon as the working piston approaches within 18° of dead center position the piston passages 45 and 46 again inter-communicate the inner end of the working cylinder with the passages 41 and 39 to permit at least partial equalization of the pressures in the working cylinder and in the passages 41 and 39, as the charge explodes.

When the charge explodes, the pressure is materially increased in the working cylinder and in the passages 40 and 38 which communicate directly therewith. However, this extreme pressure is immediately partially relieved by escape of the expanding gases through the passages 45 and 46, into the passages 41 and 39. Of course this transfer of gases through the passages 45 and 46 takes place only during 36° of movement of the crankshaft as the working piston moves past dead center. Thereafter the outer ends of the piston passages 45 and 46 clear the ports 41 and 39 in the working cylinder, and all of the force of the burning gas above the working piston is exerted against the piston until it clears the passages 41 and 39 during its downward movement. This clearance of the passages 39 and 41 permits the burning gases in the working cylinder above the working piston to ignite the gases that were previously compressed in passages 41 and 39, thereby increasing the pressure on the working piston at substantially the midpart of its stroke, as fully explained in my prior patent, previously referred to.

Fig. 5 shows the position of the working piston after it has cleared the passages 41 and 39 during the working or explosion stroke. It will be observed that in this position the outer ends of the passages 38, 39, 40 and 41 are still sealed by the intake and exhaust valve pistons. At the end of the working stroke the exhaust valve piston 11 will have moved down sufficiently to begin to register its ports 36 and 37 with the passages 40 and 41, respectively, which registration increases and decreases during the exhaust stroke and terminates at the end of the exhaust stroke, as shown in Fig. 1.

In view of the act that the valve pistons travel at only one-quarter of the speed of the working pistons, the ports in the valve pistons move into and out of registration with the working cylinder passages while traveling in opposite directions during successive cycles of the working pistons. This was brought out in my previous patent, and need not be explained further herein.

It is my belief that the piston passages 45 and 46 do not permit the propagation of flame therethrough from the working cylinder to the passages 41 and 39 but merely function to relieve the extreme pressure in the working cylinder while delivering some more or less completely burned gases through the passages 39 and 41. Certainly the combustible gases initially supplied to the passages 39 and 41 during the compression stroke are not completely ignited by any flame propagation through the passages 39 or 46 because tests show that there is a rise in the thermal pressure during the power stroke of the working piston as the latter clears the passages 39 and 41. Of course by increasing the size of the passages 45 and 46 the pressure relieving effect in the main cylinder may be increased. In a given engine, however, it is usually desirable to only relieve the peak pressure sufficiently to prevent knocking and bearing destruction. The size and number of passages 45 and 46 depends very largely on the compression ratio of the engine. It can be determined by experiments for any particular engine.

In some instances it may be found useful to provide only the piston passage 45 and omit the passage 46, or vice versa.

Although at the present time I believe that the best method of reducing the peak pressure in the working cylinder is to employ the passages 45 and 46 in the working piston, it is possible to obtain certain advantages by employing restricted passages elsewhere than in the piston for permitting restricted flow of gas from the cylinder to the ports 39 and 41. Thus passages 50 and 51, respectively, may be provided in the cylinder wall, the passage 50 interconnecting the inlet passages 38 and 39 and the passage 51 interconnecting the exhaust passages 40 and 41. Of course there may be any desired number of the passages 50 and the passages 51. Each passage should be relatively small to prevent flame propagation therethrough, and if one passage does not relieve the peak pressure sufficiently, additional small passages may be added so as to provide for the relief of the peak pressure without permitting flame propagation through the passages.

It is to be clearly understood that the passages 50 and 51 may be eliminated, may be used in combination with the passages 45 and 46, or may be used alone in place of the passages 45 and 46, or may be used alone in place of the passages 45 and 46. Tests on different engines of different design may indicate that best results can be obtained by employing both the passages 50 and 51 in the cylinder wall and the passages 45 and 46 in the piston, the dimensions of the two sets of passages being suitably dimensioned.

There is of course a difference between the actions of the passages 45 and 46 in the piston and the passages 50 and 51 in the cylinder wall. Whereas the piston passages 45 and 46 intercommunicate the passages 39 and 41 with the combustion chamber in the cylinder only during the end portion of the stroke of the working piston (while the outer ends of the passages 45 and 46 are in registration with the passages 39 and 41, respectively), the passage 50 permanently intercommunicates the passages 38 and 39, and the passage 51 permanently intercommunicates the passages 40 and 41. Since gas will tend to flow from the cylinder through passage 50 into passage 39 and through passage 51 into passage 41, as soon as the working piston covers the passages 39 and 41 on its compression stroke, there is a longer interval during which gases can flow from the cylinder into the passages 39 and 41, and thence in general the size of the passages 50 and 51 should be less than the size of the passages 45 and 46. Either arrangement of passages will reduce the peak pressure in the working cylinder and increase the pressure during the working stroke at the time the working piston uncovers the passages 39 and 41.

Although the drawings show one form of the invention that has been tested and found to be practicable, it is to be understood that the invention may be practiced in other ways, and its scope is only to be limited as set forth in the appended claims.

I claim:

1. An internal combustion engine comprising a working cylinder and working piston reciprocable therein, a chamber and a port communicating it with said cylinder, said port being so located as to be covered by said piston adjacent the compression end of its stroke, and uncovered by said piston as it recedes from the compression end of its stroke, and means including a passage extending through said cylinder wall for communicating said chamber with said cylinder during at least a portion of the time while said port is covered by said piston.

2. In an internal combustion engine comprising a working cylinder and a working piston reciprocable therein, passages extending into said cylinder for the intake and exhaust of gases, at least one of said passages entering said cylinder through the lateral wall thereof at such a position as to be covered by said piston toward the end of the compression stroke and uncovered by said piston during the power stroke, valve means for closing and opening said passage at a point spaced from said cylinder, means actuating said valve means to close said passage during the compression and power strokes of the engine, and means providing a restricted passage communicating said passage with said cylinder during at least a portion of the time while said passage is covered by said piston.

3. An internal combustion engine as described in claim 2, in which said means communicates said passage with said cylinder at least during that time when said piston is reversing its movement at the compression end of its stroke.

4. An internal combustion engine as described in claim 2, in which said means communicates said passage with said cylinder during only a fraction of that portion of the stroke of the working piston during which said passage is covered by said piston.

5. An internal combustion engine as described in claim 2, in which said communicating means comprises an opening extending through said working piston from the side thereof to the inner end thereof for communicating said passage with said cylinder during at least a portion of the time while said passage is covered by said piston.

6. An internal combustion engine as described in claim 2, in which said communicating means includes an opening extending through said piston from the side thereof to the inner end thereof, the side orifice of said opening being so positioned longitudinally of said piston as to be in registration with said passage in the cylinder wall only during movement of said piston through the extreme end portion of its stroke and during only a fraction of the total portion of the stroke in which said passage is covered by said piston.

HENRI J. HICKEY.